Figure 1:
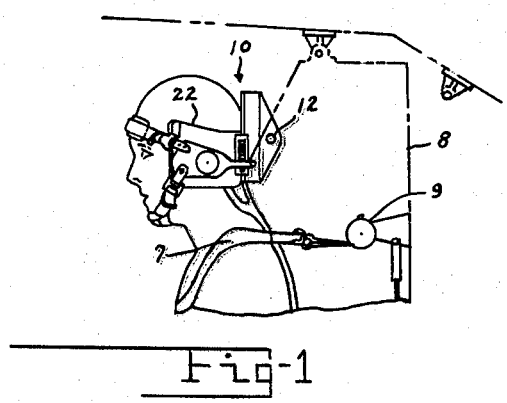

Feb. 23, 1965 P. W. WOOD, JR 3,170,659
HEAD RESTRAINT FOR USE IN SPACE VEHICLES
Filed July 16, 1964 2 Sheets-Sheet 1

INVENTOR.
PAUL W. WOOD, JR.
BY
ATTORNEYS

United States Patent Office 3,170,659
Patented Feb. 23, 1965

3,170,659
HEAD RESTRAINT FOR USE IN SPACE
VEHICLES
Paul W. Wood, Jr., Irving, Tex., assignor to the United States of America as represented by the Secretary of the Air Force
Filed July 16, 1964, Ser. No. 383,265
7 Claims. (Cl. 244—122)

This invention relates to head restraints and, more specifically, to head restraints for use by occupants of space vehicles.

Space vehicles, because of tremendous acceleration and deceleration forces encountered during certain phases of their normal operating cycle, and because of the rapidly changing attitudes they assume, can become extremely harmful to the manning personnel. Great care must be exercised to provide proper protective clothing and safety devices, including restraints, which will protect the manning personnel and will permit the human body structure to successfully cope with and survive its unnatural environment.

One of the more vulnerable areas of the human body requiring protection is the head and upper spine area. Not only must the head and neck areas be individually protected, but their relative functional relationship must be maintained; it being well known how easily the neck may be broken.

The head restraint to be disclosed may be used with equal success on horizontally recovered vehicles, such as the Dyna-Soar, or on vertically recovered vehicles, such as the Mercury, Gemini or the Apollo. While not limited to such use, the head restraint constituting this invention is particularly useful in combination with a nonrigid seat and torso restraint, and does not require the occupant to wear a helmet.

Prior head restraints, when used with nonrigid seat and torso restraint, have been either too flexible to provide the restraint required during re-entry and recovery, or have been too rigid and hence transmit loads into the cervical vertebra in the neck when the seat and torso restraint deflect. The present head restraint combines flexibility and rigidity to provide sufficient restraint against the loads while allowing for head movement during seat and torso restraint deflection.

The vertical movement in the head is implemented by the use of a nylon ("Raschel" weave) net as the material of the seating surfaces of the seat. When loads are applied to the vehicle containing the seat which tend to cause the occupant to move downward or backward, the net will deflect and allow the lower part of the body to move according to the magnitude of the load. This movement of the lower body results in the head being pulled downward to follow the body. Should the head be restrained vertically, loads will be applied to the neck tending to stretch it during loading. The present head restraint, under such conditions, permits the head to slide inside the rigid back rest and side flaps, and the chin and forehead straps will pivot and follow the head. When the load is relieved, the head will be pushed upward by the body to its normal "at rest" position.

The head restraint of the present invention is designed for large loads which would move the head aft, and for lighter loads which would move the head to each side or forward. No vertical restraint is provided other than that which is gained through the sliding friction where the head contacts the back and side members of the device. The head restraint of the present invention is readily used by the 5th through the 95th percentile crewman as established by the Air Force.

One object of the present invention is to provide an improved head restraint for use on space vehicles.

Another object of the present invention is to provide a head restraint in which the head is held in a nonrigid manner.

A further object of the present invention is to provide a head restraint in which the head may be positioned by the torso portion of the body.

Yet another object of the present invention is to provide a head restraint for use on space vehicles which may be worn without a helmet.

A still further object of the present invention is to provide a head restraint which will relieve the cervical vertebra of undue strain when the torso portion of the body tends to move away from the head.

Another object of the present invention is to provide a head restraint adapted to the head configuration of nearly any potential crewman.

Figure 2:
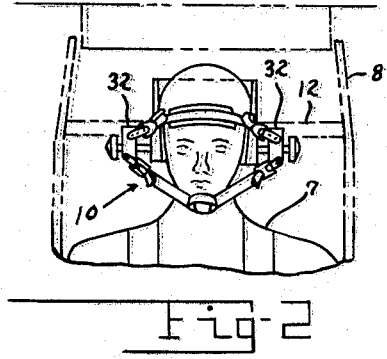
Figure 3:
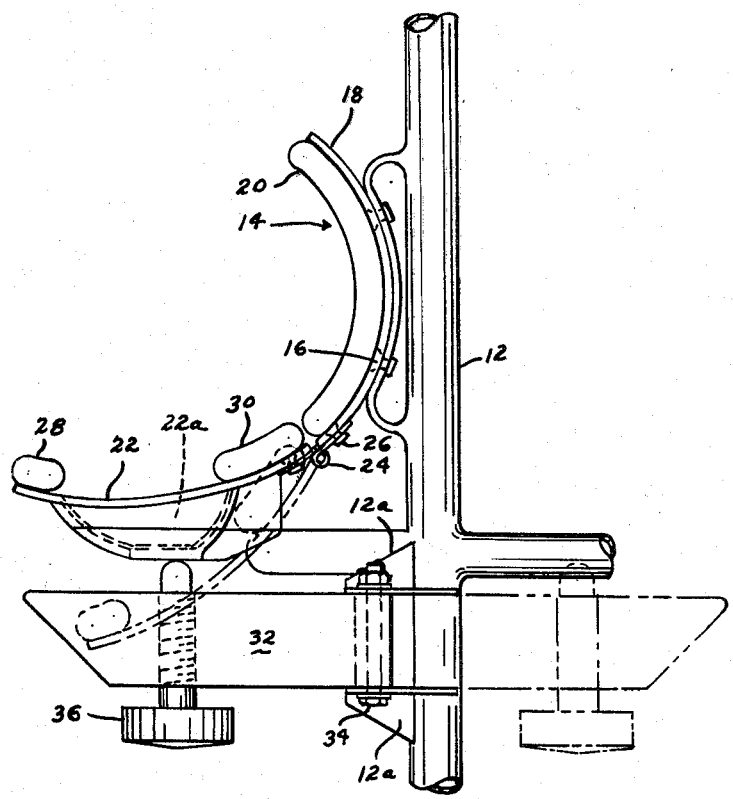
Figure 4:
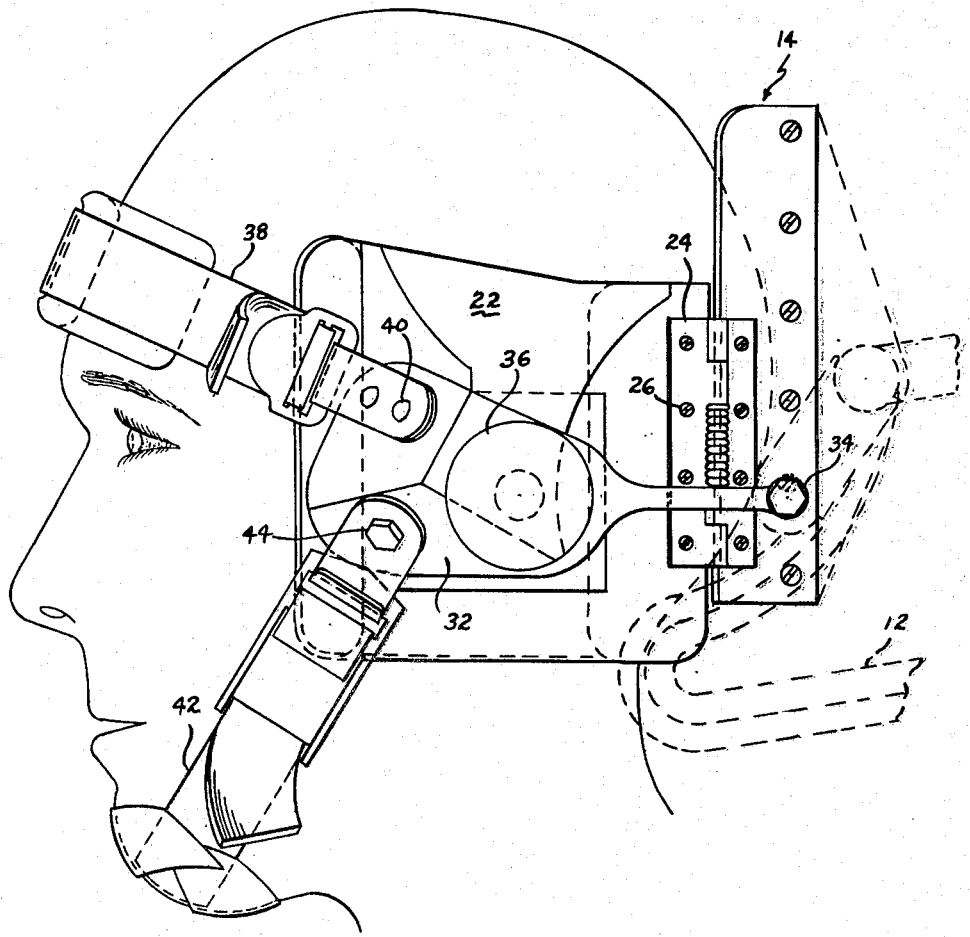

Additional objects, advantages and features of the invention reside in the construction, arrangement and combination of parts involved in the embodiment of the invention as will appear from the following description and accompanying drawings, wherein:

FIG. 1 is a fragmentary side elevation showing the upper torso, and the head of a crewman in the head restraint, FIG. 2 is a front elevation similar to FIG. 1, FIG. 3 is a plan view of a portion of the head restraint, and FIG. 4 is an enlarged side elevation, similar to FIG. 1, and showing in greater detail the construction of the head restraint.

Referring to FIG. 1 and FIG. 2, a crewman is shown restrained in a normal sitting position by means of a harness assembly including a torso vest 7 joined to seat structure 8 through a take-up reel 9. The seat structure is rigidly joined to the space vehicle, and together with the harness and takeup reel, does not constitute a portion of this invention.

The head restraint 10, constituting this invention, is joined to a frame member 12 supported by seat structure 8, as best shown on FIG. 2. The frame member 12 may take any convenient form, such as the tubular structure shown in fragmentary form on FIG. 3 and FIG. 4; the only requirement being to provide a suitable base for supporting the other elements of the head restraint.

Referring more specifically to FIG. 3 and FIG. 4, the head restraint has a rear head support 14 joined to frame member 12 by screws 16. The rear head support is horizontally curved and is padded to render proper rear and lateral support, and is made with sufficient length, as shown on FIG. 4, to fit nearly all potential crewmen. The rear head support may conveniently be made of a horizontally curved shell member 18 vertically mounted with the convex rear side on frame member 12, and having a correspondingly shaped pad 20 affixed to the concave front side thereof.

Pivotally hinged to each side of shell member 18 on a vertical pivot axis, so as to be laterally movable on the rear head support 14, is an ear flap member 22, as shown on FIG. 1, FIG. 3 (one side only) and FIG. 4. Each ear flap member may be conveniently attached by means of a hinge 24, held in place by a plurality of screws 26. The ear flap members are aligned for lateral movement toward and away from each other. As best shown on FIG. 3, each ear flap member is provided with two vertically elongated pads, pad 28 and pad 30. Pad 28 is positioned to provide suitable support at the temple area of the crewman, while pad 30 provides similar support at the area behind the ear. Each ear flap member is further provided with an outwardly extending hollow or pocket 22a (shown on FIG. 3) to surround the ear of the crewman. The ear flap members may be conveniently made from laminated fiber glass which will impart good structural rigidity with very little weight. The pockets for the ears are elongated vertically, so as to provide for vertical latitude in the torso height of nearly all potential crewmen, and for vertical body movement during use.

Pivotally mounted to any convenient portion of frame member 12 so as to straddle or be on the outside of the ear flap members 22, is a lateral anchor block 32. Each anchor block may be mounted for vertical movement about a horizontal pivot axis formed by bolt 34, supported by brackets 12a, as best shown on FIG. 3. Each anchor block supports an adjusting knob 36 having a threaded stem portion threadably engaging and laterally extending through the anchor block. The end of the threaded stem on the adjusting knob engages the adjacent ear flap member and brings the ear flap member into firm lateral engagement with the side of the crewman's head as the adjusting knob is advanced inwardly. An adjustable forehead strap 38 is joined at each end to one of the anchor blocks 32, by means of rivets 40; as best shown on FIG. 4. The forehead strap provides aft pressure for holding the head against the rear head support. A chin strap 42 of the same general construction as the forehead strap is joined at each end to one of the anchor blocks by means of screws 44, as best shown on FIG. 4 and applies vertical support to the jaw. Both the forehead strap and the chin strap are of well known adjustable construction with quick-detach snap means, and need not be further described. The straps may be joined by any well known convenient means; neither the construction details of the straps or the method of joining constituting a portion of this invention.

In use, the crewman places his head against the rear head support 14, the ear flap members 22 are laterally swung into position against the head, and the desired restraining pressure applied by means of adjusting knobs 36. The forehead and chin straps are snapped into position and adjusted for proper retention. The anchor blocks, to which the forehead and chin straps are attached, are pivoted to the frame member. With this arrangement, the head can slide inside the rigid rear head support and the ear flap members, and the forehead and chin straps will pivot and follow the movement of the head. The head restraint is designed for large loads which would move the head aft, and for lighter loads which would move the head to each side or in a forward direction. No vertical restraint is provided other than that which is gained through the sliding friction where the head engages the back and side restraints.

When not in use, the head restraint may be stowed by loosening the forehead strap, detaching the chin strap on one side, loosening the adjusting knobs to relieve the pressure on the ear flap members, and rotating the anchor blocks to the position shown by dotted line on FIG. 3. This will permit the spring biased ear flap members to spread to the position shown by dotted line on FIG. 3; thus freeing the head from all restraint.

It is to be understood that the embodiment of the present invention as shown and described is to be regarded as illustrative only and that the invention is susceptible to variations, modifications and changes within the scope of the appended claims.

I claim:

1. A head restraint for restraining the head movement of a crewman occupying a seat structure in a space vehicle during acceleration and attitude changes of the vehicle and comprising: a frame member adapted for joining to the seat structure in the space vehicle, a rear head support joined to said frame member, a pair of ear flap members one each of which is movably joined to opposite sides of said rear head support and aligned for lateral movement toward and away from each other, a pair of anchor blocks joined to said frame member and extending forward to laterally straddle said ear flap members, and a pair of adjusting means one each of which is movably joined to each of said anchor blocks for engaging the adjacent ear flap member and adjusting the lateral position of each of said ear flap members to restrain the head of the occupying crewman.

2. A head restraint for restraining the head movement of a crewman occupying a seat structure in a space vehicle during acceleration and attitude changes of the vehicle and comprising: a frame member adapted for joining to the seat structure in the space vehicle, a rear head support joined to said frame member, a pair of ear flap members one each of which is pivotally joined on a vertical axis to opposite sides of said rear head support and aligned for lateral swinging movement toward and away from each other in front of said rear head support, a pair of anchor blocks joined to said frame member and extending forward to laterally straddle said ear flap members, and a pair of adjusting knobs each having a threaded stem portion threadably engaging and laterally extending through one each of said anchor blocks and engaging the adjacent ear flap member for adjusting the lateral position of each of said ear flap members to restrain the head of the occupying crewman.

3. A head restraint for restraining the head movement of a crewman occupying a seat structure in a space vehicle during acceleration and attitude changes of the vehicle and comprising: a frame member adapted for joining to the seat structure in the space vehicle, a rear head support joined to said frame member, a pair of ear flap members one each of which is movably joined to the opposite sides of said rear head support and aligned for lateral movement toward and away from each other, a pair of anchor blocks pivotally joined to said frame member for vertical movement about the pivot and extending forward to laterally straddle said ear flap members, a forehead strap joined between said anchor blocks and applying aft pressure to restrain the head of the crewman against said rear head support, a chin strap joined between said anchor blocks and applying vertical support to the jaw of said crewman, and a pair of adjusting means one each of which is movably joined to each of said anchor blocks for engaging the adjacent ear flap member and adjusting the lateral position of each of said ear flap members to restrain the head of the occupying crewman.

4. A head restraint for restraining the head movement of a crewman occupying a seat structure in a space vehicle during acceleration and attitude changes of the vehicle and comprising: a frame member adapted for joining to the seat structure in the space vehicle, a rear head support joined to said frame member, said rear head support being a horizontally curved shell structure vertically mounted with the convex rear side against said frame member and being of sufficient length to fit nearly all potential crewmen, a pair of ear flap members one each of which is pivotally joined on a vertical axis to opposite sides of said rear head support and aligned for lateral swinging movement toward and away from each other in front of said rear head support, each of said ear flap members having an outwardly extending elongated pocket means of sufficient length for surrounding the ear of nearly all potential crewmen, a pair of anchor blocks joined to said frame member and extending forward to laterally straddle said ear flap members, and a pair of adjusting means one each of which is movably joined to each of said anchor blocks for engaging the adjacent ear flap member and adjusting the lateral position of each of said ear flap members to restrain the head of the occupying crewman.

5. A head restraint for restraining the head movement of a crewman occupying a seat structure in a space vehicle during acceleration and attitude changes of the vehicle and comprising: a frame member adapted for joining to the seat structure in the space vehicle, a rear head support joined to said frame member, said rear head support being a horizontally curved shell structure vertically mounted with the convex rear side against said frame member and being of sufficient length to fit nearly all potential crewmen, a pair of ear flap members one each of which is pivotally joined on a vertical axis to opposite sides of said rear head support and aligned for lateral swinging movement toward and away from each other in front of said rear head support, each of said ear flap members having an outwardly extending elongated pocket means of sufficient length for surrounding the ear of nearly all potential crewmen, a pair of anchor blocks pivotally joined to said frame member for vertical movement about the pivot and extending forward to laterally straddle said ear flap members, a forehead strap joined between said anchor blocks and applying aft pressure to restrain the head of the crewman against said rear head support, a chin strap joined between said anchor blocks and applying vertical support to the jaw of said crewman, and a pair of adjusting knobs each having a threaded stem portion threadably engaging and laterally extending through one each of said anchor blocks and engaging the adjacent ear flap member for adjusting the lateral position of each of said ear flaps to restrain the head of the accompanying crewman.

6. A head restraint for restraining the head movement of a crewman occupying a seat structure in a space vehicle during acceleration and attitude changes of the vehicle and comprising: a frame member adapted for joining to the seat structure in the space vehicle, a rear head support joined to said frame member, said rear head support being a horizontally curved shell structure vertically mounted with the convex rear side against said frame member and being of sufficient length to fit nearly all potential crewmen, a pair of ear flap members one of which is pivotally joined on a vertical axis to opposite sides of said rear head support and aligned for lateral swinging movement toward and away from each other in front of said rear head support, each of said ear flap members having an outwardly extending elongated pocket means of sufficient length for surrounding the ear of nearly all potential crewmen, biasing means cooperatively acting between each of said ear flap members and said rear head support for biasing said ear flap members away from each other, a pair of anchor blocks pivotally pointed to said frame member on a horizontal pivot axis for vertical movement and extending forward to laterally straddle said ear flap members, said anchor blocks further being rotatable on the pivot axis to a position permitting said biasing means to move said ear flap members to their outermost positions, and a pair of adjusting knobs each having a threaded stem portion threadably engaging and laterally extending through one each of said anchor blocks and engaging the adjacent ear flap member for adjusting the lateral position of each of said ear flap members to restrain the head of the occupying crewman.

7. A head restraint for restraining the head movement of a crewman occupying a seat structure in a space vehicle during acceleration and attitude changes of the vehicle and comprising: a frame member adapted for joining to the seat structure in the space vehicle, a rear head support joined to said frame member, said rear head support being a horizontally curved shell structure vertically mounted with the convex rear side against said frame member and being of sufficient length to fit nearly all potential crewmen, a pair of ear flap members one each of which is pivotally joined on a vertical axis to opposite sides of said rear head support and aligned for lateral swinging movement toward and away from each other in front of said rear head support, each of said ear flap members having an outwardly extending elongated pocket means of sufficient length for surrounding the ear of nearly all potential crewmen, biasing means cooperatively acting between each of said ear flap members and said rear head support for biasing said ear flap members away from each other, a pair of anchor blocks pivotally joined to said frame member on a horizontal pivot axis for vertical movement and extending forward to laterally straddle said ear flap members, said anchor blocks further being rotatable on the pivot axis to a position permitting said biasing means to move said ear flap members to their outermost positions, a forehead strap joined between said anchor blocks and applying aft pressure to restrain the head of the crewman against said rear head support, a chin strap joined between said anchor blocks and applying vertical support to the jaw of said crewman, and a pair of adjusting knobs each having a threaded stem portion threadably engaging and laterally extending through one each of said anchor blocks and engaging the adjacent ear flap member for adjusting the lateral position of each of said ear flap members to restrain the head of the occupying crewman.

No references cited.

FERGUS S. MIDDLETON, *Primary Examiner.*